Nov. 20, 1928.
L. C. JOSEPHS, JR
1,692,375
PRESSURE RELIEF VALVE FOR FLUID PUMPS
Filed Aug. 19, 1927
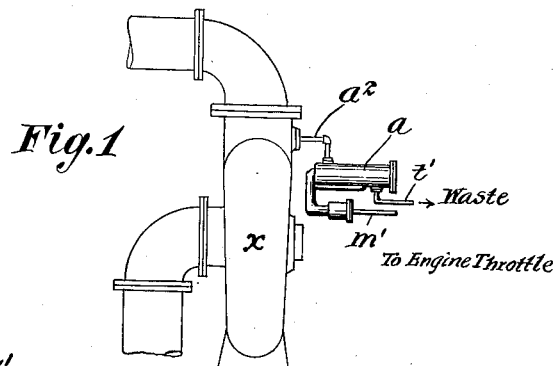
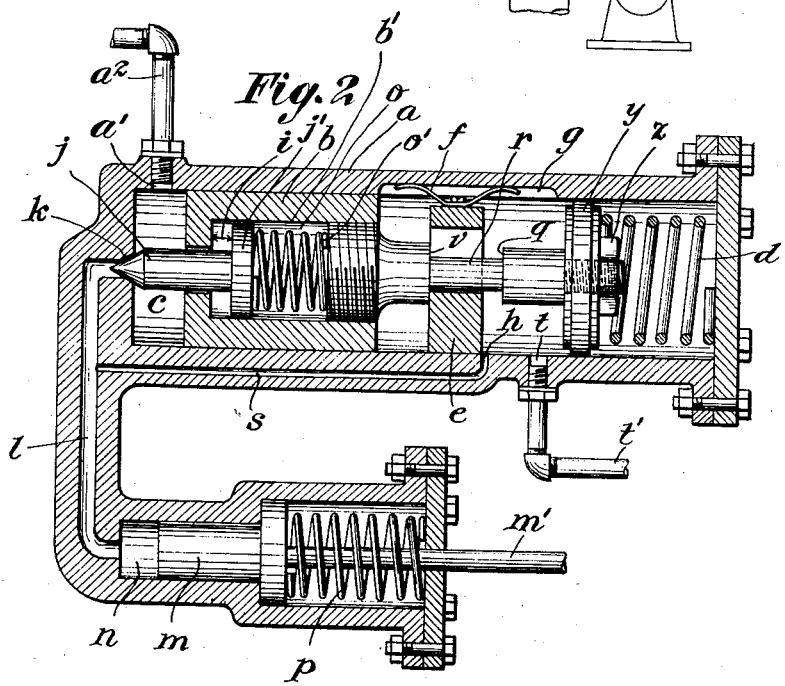
Inventor:
Lyman C. Josephs Jr.
By his attorneys
Redding, Greeley, O'Shea & Campbell Patented Nov. 20, 1928.

1,692,375

UNITED STATES PATENT OFFICE.

LYMAN C. JOSEPHS, JR., OF ALLENTOWN, PENNSYLVANIA, ASSIGNOR TO INTERNATIONAL MOTOR COMPANY, OF NEW YORK, N. Y., A CORPORATION OF DELAWARE.

PRESSURE-RELIEF VALVE FOR FLUID PUMPS.

Application filed August 19, 1927. Serial No. 214,061.

This invention relates to pressure relief valves for water pumps and particularly to such valves which are adapted for use in connection with fire pumps driven by the engine of the well known type of automotive fire truck in common use.

Broadly, the invention contemplates the provision of a relief valve for use in the connection mentioned above, for instance, which shall provide means for maintaining the pressure in the water on the pressure side of the pump as nearly constant, between definite limits, as possible. To accomplish this the valve is connected to the pressure side of the pump and means are provided whereby the valve will automatically vary the speed of the engine which drives the pump, actuation of the valve being automatically determined by fluctuations of pressure in the pump.

A distinguishing feature of this invention is the provision of means, in a valve of the nature indicated, for quick operation in case of surges in pressure, as compared with the relatively slow operation when the increase in pressure is gradual.

Another distinguishing feature is the provision of means for allowing for a definite range in pressure between the extremes of which the valve will open or close, this range being sufficient to prevent the setting up of what is known as "hunting" between the engine and the pump.

Other features of the invention reside in details of construction which will be pointed out hereinafter or which will be apparent from the following detailed description, in which reference is made to the accompanying drawings, in which:

Figure 1 is a somewhat schematic view showing the manner in which a pressure relief valve according to the invention may be connected to the pressure side of a centrifugal pump; and Figure 2 is a vertical section through the valve and showing the arrangement of parts therewithin.

It is to be understood that, though a valve embodying the principles underlying this invention will be described with reference to its use in connection with a fire pump driven by an internal combustion engine, this has been done only the more clearly to set forth the operation of the valve. In fact, a valve such as that hereinafter described will find a wide variety of uses.

The body of the valve $a$ is provided with a port $a'$ which is connected to the pressure side of a centrifugal pump $x$ as by means of the piping $a^2$. Water under pressure from the pump enters the valve through the port $a'$ and acts against the piston $b$ in the cylinder $c$ tending to force the piston to the right against the action of the spring $d$. If the pressure within the cylinder $c$ gradually becomes sufficiently great to overcome the force exerted by the spring $d$ the piston $b$ will gradually move to the right. This motion will cause the slide valve $e$, which is held against its seat by means of the leaf spring $f$ riding in the slot $g$, to move to the right and close the port $h$. As the piston $b$ moves to the right the clearance space $i$ will be diminished until finally the needle valve $j$ will be lifted off its seat $k$, thereby admitting water under pressure into the passage $l$ and the cylinder $n$ and forcing the piston $m$ to the right against the action of the spring $p$. The piston $m$ is connected by the rod $m'$ to the throttle of the engine which drives the pump $x$.

As the piston $b$ moves to the right closing up the clearance space $i$, the water within the clearance space $i$ passes to the other side of the flat head $j'$ of the needle valve into the space indicated by $o$. The water flows into the space $o$ rather than back into the cylinder $c$ because the pressure in the space $o$ is less than that in the cylinder. The clearance between the periphery of the flat head $j'$ of the needle valve and the inner wall $b'$ of the piston is small. Consequently a considerable time element is required for the transfer of the water. Therefore, should there be a very sudden rise or surge in pressure in the cylinder $c$, there will not be sufficient time for the water to flow into the space $o$ and hence the needle valve $j$ will be lifted from its seat instantly, admitting water to the cylinder $n$, thereby forcing the piston $m$ to the right and closing the throttle of the engine more quickly and at a lower pressure than if the rise in pressure in the cylinder $c$ had been gradual.

The pressure at which the piston $b$ will move to the right is determined by the force exerted by the spring $d$, which may be adjusted by means of the element $y$ and the lock nut $z$. The spring $p$ is merely a light spring the purpose of which is to return the piston $m$ to the left when the pressure within the cylinder $n$ is released. The difference between the pressure at which the needle valve $j$ will be lifted from its seat on account of gradual increases in pressure within the cylinder $c$ and that at which it will be lifted on account of sudden surges is determined by the size of the clearance space $i$, by the fit of the stem of the needle valve $j$ in the head of the piston $b$, by the clearance between the periphery of the flat head $j'$ of the needle valve and the inner wall $b'$ of the piston, and by the strength of the small spring $o'$.

When the valve has been actuated due to an increase in pressure, which forces the piston $m$ to the right closing the throttle of the engine by means of the rod $m'$, the speed of the engine which drives the pump $x$, will be decreased and, of course, the pressure in the cylinder $c$ will be reduced. As the pressure diminishes the piston $b$ will commence to move back to the left under the action of the spring $d$ thereby closing the needle valve $j$ and admitting no more water to the cylinder $n$. Water already in the cylinder $n$ will be trapped therein; the piston $m$ will remain stationary; and consequently the engine throttle which is controlled by the rod $m'$ will remain fixed. But as the pressure in the cylinder $c$ is still further diminished the piston $b$ will move still farther to the left until finally the shoulder $q$ on the shank $r$ of the piston will come into contact with the valve $e$ causing it to move to the left, thereby uncovering the port $h$. The port $h$ is connected by means of a small passage $s$ with the passage $l$ at a point between the cylinder $n$ and the seat $k$ for the needle valve. Thus some of the water from the cylinder $n$ will pass through the port $h$ and out through the port $t$ and the waste connection $t'$, thereby permitting the piston $m$ to move to the left under the action of the spring $p$ and again opening the throttle. The distance between the abutments $v$ and $q$ on the shank $r$ by means of which the valve $e$ is slid to right or left is so proportioned that there is a difference in pressure of, say, ten pounds between the point at which the port $h$ is closed and the point at which it is opened. This differential is sufficient to prevent the setting up of "hunting" between the engine and the pump.

In cases where a sudden surge in pressure causes the instantaneous lifting of the needle valve $j$ from its seat some water may flow through the passage $s$ and out through the port $h$ before the valve $e$ has closed the port $h$. However, the passage $s$ is made smaller than the passage $l$ so that the major portion of the water, even before the port $h$ is closed, will be forced into the cylinder $n$.

The port $t$ preferably drains to atmosphere but, if desired, may be connected to the suction side of the pump. However, in the latter case the valve will operate to maintain a nearly constant differential in pressure between the suction and pressure sides of the pump instead of maintaining a nearly constant fixed pressure above atmosphere. Similarly, should the pump be connected to a hydrant the valve will not operate satisfactorily unless the spring $p$ is made adjustable and is adjusted together with the spring $d$.

It will be seen that there has been provided a pressure relief valve which affords almost instantaneous relief in case of sudden surges in pressure while when the increase in pressure is gradual, relief is not afforded until after the lapse of a predetermined interval. When used in conjunction with a pump driven by an internal combustion engine, the valve operates in such a manner as to hold the throttle of the engine in some fixed position at which the speed of the engine may adjust itself to drive the pump at a rate at which the pressure will be at some point between the two extremes for which the valve is set, thereby preventing "hunting" between the engine and the pump. The valve is compact and simple to manufacture and automatic in operation.

No limitation upon the scope of the invention is intended except as is indicated in the following claims:

1. In a pressure relief valve for fluid pumps having means to control the actuation of a pressure forming means, a cylinder for connection with the pressure side of the pump, means in the cylinder operable upon an increase of pressure to initiate actuation of controlling means to reduce the pressure, means associated with the actuating means and unresponsive to gradual increases in pressure to prevent actuation of the controlling means, and means to cause actuation of the controlling means after a predetermined interval, said mechanism responding to a sudden surge in pressure to cause substantially instantaneous actuation of the controlling means.

2. In a pressure relief valve for fluid pumps having means to control the actuation of a pressure forming means, a cylinder for connection with the pressure side of the pump, a piston in said cylinder, means causing the piston to move upon an increase in pressure within the cylinder beyond a predetermined point, a passage controlled by the piston, a needle valve carried with the piston to normally close the passage, means associated with the piston and unresponsive to a gradual increase in pressure within the cylinder to prevent the valve from being lifted by reason thereof, means to cause the passage to be opened after the lapse of a predetermined interval of movement of the piston, said piston and associated means being responsive to a sudden surge in pressure to cause the valve to be lifted and the passage opened substantially instantaneously, a second passage between the first named passage and the cylinder, said second named passage communicating with the said cylinder at a point such that the head of the piston at all times lies between it and the point at which the first named passage communicates with the cylinder, and a slide valve adapted to close said second named passage after predetermined movement of the piston and to open said passage only after a predetermined interval after the first named passage has been closed during the return of the parts to normal position, whereby the second named piston will be prevented from returning to normal position until the lapse of an interval after the pressure has been reduced.

3. In a pressure relief valve for fluid pumps having means to control the actuation of a pressure forming means, a cylinder for connection with the pressure side of the pump, a piston in said cylinder, means causing the piston to move upon an increase in pressure within the cylinder beyond a predetermined point, a passage controlled by the piston, a needle valve carried with the piston to normally close the passage, means associated with the piston and unresponsive to a gradual increase in pressure within the cylinder to prevent the valve from being lifted by reason thereof, means to cause the passage to be opened after the lapse of a predetermined interval of movement of the piston, said piston and associated means being responsive to a sudden surge in pressure to cause the valve to be lifted and the passage opened substantially instantaneously, a second passage between the first named passage and the cylinder, said second named passage communicating with the said cylinder at a point such that the head of the piston at all times lies between it and the point at which the first named passage communicates with the cylinder, a waste connection communicating with the cylinder on the same side of the piston as said second named passage, and a slide valve adapted to close said second named passage after predetermined movement of the piston and to open said passage only after a predetermined interval after the first named passage has been closed during the return of the parts to normal position, whereby the second named piston will be prevented from returning to normal position until the lapse of an interval after the pressure has been reduced.

This specification signed this 16th day of August, A. D. 1927.

LYMAN C. JOSEPHS, Jr.